United States Patent
Mecayten

(10) Patent No.: US 6,725,191 B2
(45) Date of Patent: Apr. 20, 2004

(54) METHOD AND APPARATUS FOR TRANSMITTING VOICE OVER INTERNET

(75) Inventor: Ofir Mecayten, Netanya (IL)

(73) Assignee: VocalTec Communications Limited, Herzliya (IL)

( * ) Notice: Subject to any disclaimer, the term of this patent is extended or adjusted under 35 U.S.C. 154(b) by 328 days.

(21) Appl. No.: 09/909,052

(22) Filed: Jul. 19, 2001

(65) Prior Publication Data
US 2003/0018480 A1 Jan. 23, 2003

(51) Int. Cl.[7] .............................. G10L 11/02; H04L 1/22
(52) U.S. Cl. ........................ 704/215; 704/500; 370/477
(58) Field of Search .............................. 704/201, 211, 704/214, 215, 500, 501, 503, 504, 210; 370/465, 468, 477; 714/6, 748, 819, 822

(56) References Cited

U.S. PATENT DOCUMENTS

| 4,100,377 A | * | 7/1978 | Flanagan | 370/435 |
| 5,535,200 A | * | 7/1996 | Gardner | 370/410 |
| 5,751,903 A | * | 5/1998 | Swaminathan et al. | 704/230 |
| 6,081,907 A | * | 6/2000 | Witty et al. | 714/6 |
| 6,167,060 A | * | 12/2000 | Vargo et al. | 370/468 |
| 6,324,188 B1 | * | 11/2001 | Tsuji | 370/537 |
| 6,349,286 B2 | * | 2/2002 | Shaffer et al. | 704/503 |
| 6,374,211 B2 | * | 4/2002 | Stegmann et al. | 704/211 |
| 6,466,574 B1 | * | 10/2002 | Fujisaki et al. | 370/356 |

* cited by examiner

Primary Examiner—Richemond Dorvil
Assistant Examiner—Martin Lerner
(74) Attorney, Agent, or Firm—Katten Muchin Zavis Rosenman

(57) ABSTRACT

A method for transmitting speech of a first person communicating with a second person via a packet switched network comprising: generating a stream of samples of the first person's speech during the communication; parsing the sample stream into audio frames; determining which audio frames correspond to periods when the first person is speaking and which correspond to periods when the first person is silent; transmitting audio frames corresponding to silent periods and speaking periods of the first person's speech; and transmitting at least some of the audio frames corresponding to speaking periods, but none of the audio frames corresponding to silent periods, at least twice.

16 Claims, 2 Drawing Sheets

METHOD AND APPARATUS FOR TRANSMITTING VOICE OVER INTERNET

FIELD OF THE INVENTION

The invention relates to transmitting voice over the internet and in particular to reducing bandwidth required to transmit voice over the internet

BACKGROUND OF THE INVENTION

Methods and apparatus for transmitting voice over internet protocol (VOIP) are known. VOIP services are offered by numerous companies and standards for internet telephony have been promulgated by the ITU-T. The ITU-T umbrella standard for VOIP is H.323 rev 2 (1998), "Packet based multimedia communications systems", the disclosure of which is incorporated herein by reference. An alternative umbrella standard referred to as "Session Initiation Protocol (SIP)" has recently been promulgated for internet telephony by the Internet Engineering Task Force (IETF).

In an internet telephony session between a first and second party, an internet connection is provided between communication equipment at the first party's premises and communication equipment at the second party's premises via their respective internet service providers. During the telephony session each party's communication equipment generates a stream of samples of the party's speech which is parsed into a sequence of groups referred to as "audio frames". Each audio frame contains a predetermined desired number of samples and corresponds to a desired sampling period. The communication equipment encodes the samples in each audio frame in a constellation of symbols using an appropriate audio encoding scheme such as PCM, ADPCM or LPC.

Each encoded audio frame is encapsulated in a "real time transport packet" in accordance with a real time transport protocol. Under the ITU-T H323 internet telephony standard, the audio frame is encapsulated in an RTP packet in accordance with a real time protocol referred to by the acronym "RTP". RTP is defined in Schulzrinne, et al., "RTP: A Transport Prototcol for Real-Time Applications", RFC 1889, Internet Engineering Task Force, January 1996 the disclosure of which is incorporated herein by reference.

In accordance with RFC 1889, the real time transport packet, hereinafter referred to as an "RTP packet", that encapsulates the audio frame comprises a header having a sequence number. The sequence number corresponds to the temporal order of the audio frame in the RTP packet relative to other audio frames in the sequence of audio frames generated by the communication equipment. Each RTP packet is in turn packaged in a data packet with a suitable data packet header according to an internet transport protocol. Typically, the internet transport protocol for "RTP transmission" is UDP. The data packets are transmitted in a stream of data packets over the internet to the other party.

When the other party receives the stream of data packets, the other party's communication equipment strips each data packet in the stream and its enclosed RTP packet of their respective headers to "unload" the audio frame "payload" in the RTP packet. The communication equipment then concatenates the unloaded audio frames sequentially according to the sequence numbers of their respective RTP packets. The concatenated audio frames are decoded and converted to analogue audio signals to reproduce the speech of the party transmitting the data packets.

Transmission of data packets using UDP can be unreliable and data packets sent via UDP can disappear without a trace and never reach their intended destinations. A data packet can be lost for example if it passes through a network node that is overloaded and "decides" to dump excess traffic. The rate at which data packets are lost generally increases as a network becomes more congested.

To improve reliability and quality of internet telephony using RTP "on top of" UDP and reduce effects of data packet loss on internet telephony, redundancy is sometimes implemented in audio frame transmission between parties to an internet telephony session. With redundancy a same audio frame to be transmitted from one to the other of the parties participating in the internet telephony session is transmitted more than once to assure that it reaches its destination. A redundancy protocol has been promulgated in C. Perkins et al., "RTP Payload for Redundant Audio Data" RTP 2198. Internet Engineering Task Force, September 1997 the disclosure of which is incorporated herein by reference.

While redundancy reduces vulnerability of data transmission to packet loss and improves reliability of data transmission, transmission of data with redundancy generally requires a bit-rate greater than a bit-rate required to transmit the data without redundancy. Redundant data transmission therefore utilizes a greater portion of channel capacity than non-redundant transmission. As a result, while redundancy provides some protection against data packet loss, redundancy tends to increase network congestion, which can in turn exacerbate the packet loss problem redundancy is intended to alleviate. Frugal use of redundancy is therefore generally advisable.

U.S. patent application Ser. No. 09/241,857, entitled "Method & Apparatus for Transmitting Packets", the disclosure of which is incorporated in its entirety herein by reference, describes a method of implementing redundancy in audio and video data packet transmission over the internet. The method discloses inter alia, controlling use of redundancy in transmitting information over an internet channel responsive to transmission conditions over the channel so as to reduce channel capacity required to support data transmission with redundancy.

SUMMARY OF THE INVENTION

An aspect of some embodiments of the present invention relates to providing a method for transmitting voice over the internet with redundancy that can generally be implemented at average bit-rates that are lower than average bit-rates required by prior art methods of transmitting voice over the internet with redundancy. As a result, a VOIP redundancy method, in accordance with an embodiment of the present invention, generally uses less channel capacity than prior art VOIP redundancy methods.

In accordance with an embodiment of the present invention, the speech of a person participating in an internet telephony session with another person or persons is monitored to determine when the person is speaking and when the person is silent. In addition for periods, hereinafter referred to as "voice periods", during which the person is speaking, the person's speech is optionally analyzed to determine which portions of the voice periods are stationary.

A stationary portion of a speech period is a time period, having duration equal to duration of at least two audio frames into which a person's speech is parsed for transmission, during which a power spectrum of the voice period is substantially constant. Stationary portions of a voice period are referred to as stationary intervals. Except for a first audio frame that falls entirely within a stationary interval, audio frames that fall entirely within a stationary interval are referred to as stationary audio frames. Audio frames that are not entirely within a stationary interval or audio frames which are a first audio frame completely within a stationary interval are referred to as non-stationary audio frames. By definition, stationary audio frames from a same stationary interval have a same spectrum. As a result any stationary audio frame in a stationary interval can be reconstructed from a previous audio frame in the stationary interval.

In some embodiments of the present invention, as in many prior art VOIP systems, both silent periods and voice periods of the person's speech are encoded in audio frames and transmitted in data packets to the person or persons with whom the person is speaking. However, in accordance with an embodiment of the present invention, if redundancy is required during the telephony session to assure quality of voice transmission, redundancy is implemented only for voice periods of the person's speech and optionally only for non-stationary audio frames of the voice periods. Redundancy is not implemented for the silent periods of the person's conversation and optionally not implemented for stationary audio frames of voice periods.

If a stationary audio frame of a VOIP transmission gets lost, communication equipment receiving the VOIP transmission reconstructs the lost audio frame from a spectrum of an audio frame in a same stationary interval as the lost audio frame. Optionally, the audio frame is an audio frame preceding the lost stationary audio frame. Optionally, the lost audio frame is reconstructed from an audio frame immediately preceding the lost stationary audio frame. (It is noted an audio frame immediately preceding a stationary audio frame is either a stationary audio frame of a stationary interval in which the lost audio frame is located or a first audio frame of the stationary interval. In either case, the preceding audio frame has a same spectrum as the lost audio frame, and the lost audio frame can therefore be reconstructed therefrom.)

It is noted that some VOIP protocols do not encode silent periods of a person's speech and instead transmit predetermined "comfort noise" during the silent periods. In some embodiments of the present invention for which comfort noise is transmitted during silent periods of a person's speech, if redundancy is required to provide quality of transmission, redundancy is implemented only for non-stationary audio frames of the person's voice periods.

Redundancy coding only for voice periods of a person's speech and optionally only for non-stationary audio frames of the voice periods, in accordance with embodiments of the present invention, is hereinafter referred to as "voice-selective redundancy". Prior art redundancy coding, which is implemented for both voice and silent periods of a person's speech, is hereinafter referred to as "non-voice-selective redundancy".

As a result of implementing voice-selective redundancy, in accordance with an embodiment of the present invention, substantially less data has to be transmitted to support redundancy for VOIP and redundancy can be provided at bit-rates that are substantially less than bit-rates required by prior art VOIP redundancy methods. Transmitting voice using voice-selective redundancy, in accordance with an embodiment of the present invention, therefore uses less channel capacity and results in less channel congestion than transmitting voice using prior art non-selective redundancy.

For example, assume that to transmit a person's speech over the internet with non-selective redundancy according to prior art requires a bit-rate that is 40% greater than that required for transmitting the person's speech without redundancy. It is noted that a person's speech is generally punctuated by relatively long and frequent periods of silence when conversing with another person, and in particular when conversing with another person over the telephone. On the average, a person conversing with another person over the telephone is substantially silent about 60% of the time and voice periods occupy only about 40% of the person's speech. Furthermore, stationary intervals of voice periods may occupy on average as much as 50% of a person's voice periods. Therefore, assuming that 60% of the person's speech consists of periods of silence, implementing redundancy only for voice periods of the person's speech, in accordance with an embodiment of the present invention, requires an average bit-rate that is only about 16% greater than the non-redundant bit-rate. If in addition, in accordance with an embodiment of the present invention, redundancy is implemented only for non-stationary audio frames, an average bit rate that is only about 8% greater than the non-redundant bit rate is required to support redundancy. The last result assumes that non-stationary audio frames account on average for about 50% of a voice period.

It is noted that voice-selective redundancy, in accordance with an embodiment of the present invention, provides substantially a same quality of voice transmission as non-voice selective redundancy. Loss of "silent" audio frames that encode silent periods of a person's speech do not substantially affect perceived quality of reception. In addition, as noted above, lost stationary audio frames which encode portions of voice periods of a person's speech are reconstructed from a spectrum of an audio frame optionally temporally adjacent to the lost audio frame. As a result, even though voice-selective redundancy, in accordance with an embodiment of the present invention, does not protect against loss of data packets carrying silent audio frames it provides a substantially same quality of speech transmission as non-voice-selective redundancy.

An aspect of some embodiments of the present invention relates to providing communication equipment for implementing VOIP with voice-selective redundancy, in accordance with an embodiment of the present invention.

Communication equipment for VOIP, in accordance with an embodiment of the present invention, comprises a controller and a voice monitor. The voice monitor monitors speech of a person using the communication equipment to identify silent periods and voice periods of the person's speech. The voice periods are then analyzed to distinguish between stationary and non-stationary intervals. The monitor generates signals responsive to the person's speech that it transmits to the controller to indicate when the silent periods, stationary intervals and non-stationary intervals occur. If redundancy is required to provide quality VOIP, the controller controls the communication equipment to implement redundancy during voice periods of the person's speech and optionally, to implement redundancy only during non-stationary intervals of the voice periods.

There is therefore provided, in accordance with an embodiment of the present invention, a method for transmitting speech of a first person communicating with a second person via a packet switched network comprising: generating a stream of samples of the first person's speech during the communication; parsing the sample stream into audio frames; determining which audio frames correspond to periods when the first person is speaking and which correspond to periods when the first person is silent; transmitting audio frames corresponding to silent periods and speaking periods of the first person's speech; and transmitting at least some of the audio frames corresponding to speaking periods, but none of the audio frames corresponding to silent periods, at least twice.

Optionally, transmitting an audio frame corresponding to a speaking period at least twice comprises transmitting the audio frame at least twice only if a quality of transmission criterion indicates that the audio frame should be transmitted at least twice.

Optionally the quality of transmission criterion is a packet loss rate criterion and an audio frame is transmitted at least twice only if the packet loss rate over the network between the first and second persons exceeds a predetermined maximum.

Optionally, transmitting audio frames corresponding to silent periods and speaking periods comprises transmitting each of the audio frames into which the first person's speech is parsed at least once.

In some embodiments of the present invention, transmitting at least some of the audio frames corresponding to speaking periods at least twice comprises: for each audio frame corresponding to a speaking period, determining that the audio frame is a stationary audio frame if it is an audio frame, but not the first audio frame, of a sequence of at least two consecutive audio frames for which the first person's speech is stationary; and only if the audio frame is not a stationary audio frame, transmitting the audio frame at least twice.

Optionally, transmitting an audio frame corresponding to a speaking period at least twice comprises transmitting the audio frame at least twice only if a quality of transmission criterion indicates that the audio frame should be transmitted at least twice.

Optionally, the quality of transmission criterion is a packet loss rate criterion and an audio frame is transmitted at least twice only if the packet loss rate over the network between the first and second persons exceeds a predetermined maximum.

In some embodiments of the present invention, transmitting audio frames corresponding to silent periods and speaking periods comprises transmitting each of the audio frames into which the first person's speech is parsed at least once.

There is further provided, in accordance with an embodiment of the present invention, a method for transmitting speech of a first person communicating with a second person via a packet switched network comprising: generating a stream of samples of the first person's speech during the communication; parsing the sample stream into audio frames; determining which audio frames correspond to periods when the first person is speaking and which correspond to periods when the first person is silent; transmitting audio frames corresponding to silent periods and speaking periods of the first person's speech; for each audio frame corresponding to a speaking period, determining that the audio frame is a stationary audio frame if it is an audio frame, but not the first audio frame, of a sequence of at least two consecutive audio frames for which the first person's speech is stationary; and transmitting the audio frame at least twice if and only if it is not a stationary audio frame.

Optionally, transmitting audio frames corresponding to silent periods and speaking periods comprises transmitting each of the audio frames into which the first person's speech is parsed at least once.

There is further provided, in accordance with an embodiment of the present invention, a method for transmitting speech of a first person communicating with a second person via a packet switched network comprising: generating a stream of samples of the first person's speech during the communication; parsing the sample stream into audio frames; determining which audio frames correspond to periods when the first person is speaking and which correspond to periods when the first person is silent; for each audio frame corresponding to a speaking period, determining that the audio frame is a stationary audio frame if it is an audio frame, but not the first audio frame, of a sequence of at least two consecutive audio frames for which the first person's speech is stationary; and transmitting the audio frame at least once if it is not a stationary audio frame and not transmitting the audio frame if it is a stationary audio frame.

Optionally, the method comprises not transmitting audio frames of the first person's speech if the audio frames correspond to periods when the first person is silent.

Alternatively the method comprises, for each silent period optionally transmitting only a first audio frame of the silent period at least once.

There is further provided, in accordance with an embodiment of the present invention, apparatus for transmitting a person's speech over a packet switched network comprising: transmission apparatus that generates audio frames of the person's speech and transmits the audio frames over the network; a network sensor that determines whether audio frames should be transmitted more than once to meet a quality criteria of transmission; a voice monitor that determines during speech when the person is speaking and when the person is silent; and a controller that controls the transmission apparatus, wherein if the network monitor determines that an audio frame should be transmitted more than once, the controller controls the transmission apparatus to transmit the audio frame more than once only if the voice monitor indicates that the audio frame does not correspond to a time when the person is silent.

Optionally, the voice monitor determines whether an audio frame corresponding to a time at which the person is speaking corresponds to a time during which the person's speech is stationary.

Optionally, if the voice monitor determines that an audio frame corresponds to a time at which the person's speech is stationary, the controller controls the transmission apparatus to transmit the audio frame only once.

BRIEF DESCRIPTION OF FIGURES

Non-limiting examples of embodiments of the present invention are described below with reference to figures attached hereto. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1:
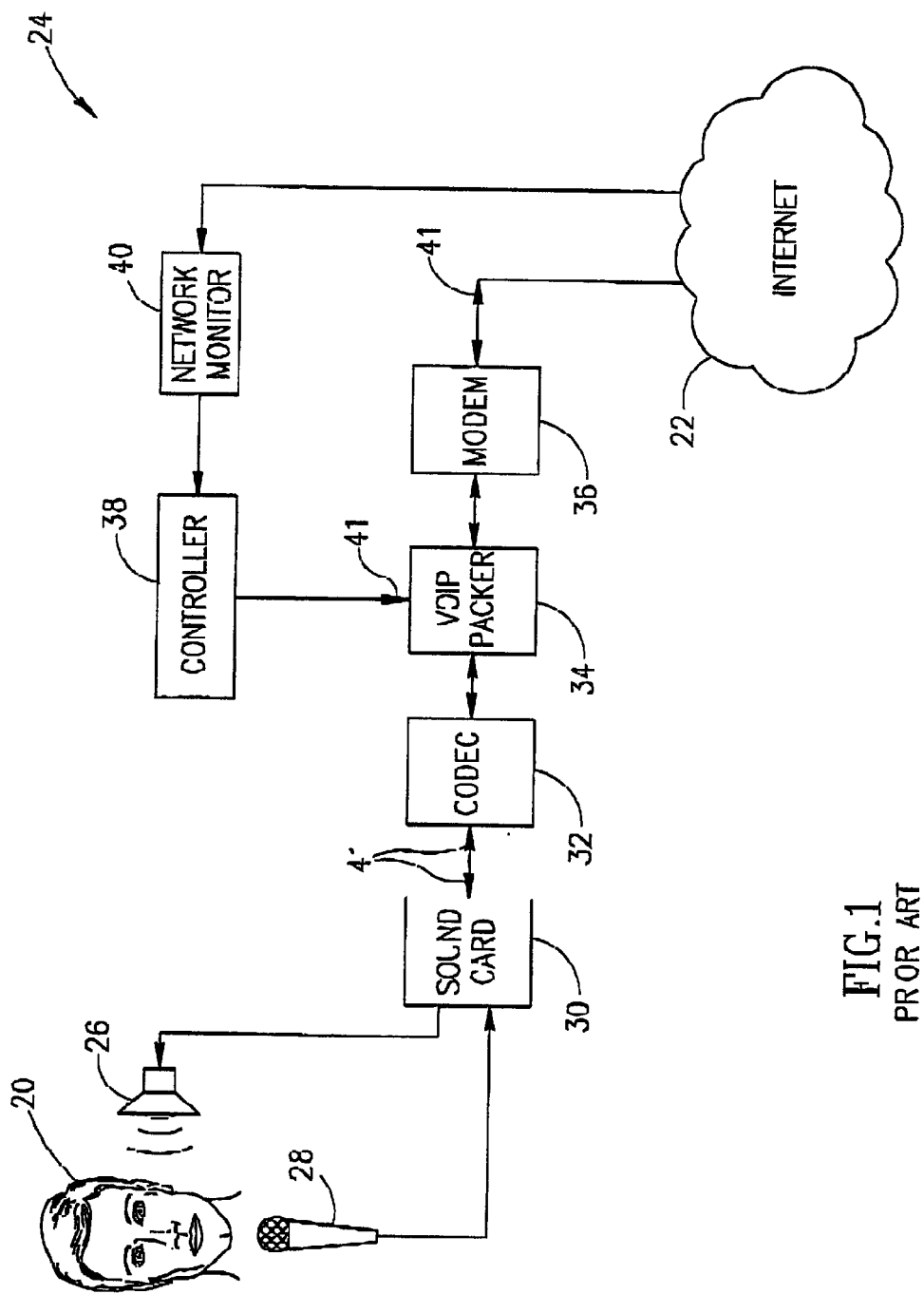
FIG. 1 schematically shows a person engaging in an internet telephony session using communication equipment that implements non-voice selective redundant VOIP, in accordance with prior art.

FIG. 1 schematically shows a person 20 conducting a telephone conversation with an interlocutor (not shown) via a communication channel established in the internet 22. Person 20 is shown, by way of example, using communication equipment 24 that implements VOIP with non-voice-selective redundancy coding, in accordance with prior art and it is assumed that the interlocutor is using similar equipment. Communication equipment 24 and method of performing non-voice-selective redundancy are, for example, similar respectively to communication equipment and non-voice-selective redundancy coding described in U.S. patent application Ser. No. 09/241,857 referenced above. Communication equipment 24 and its components, which are discussed below, and variations thereof may, for example, be comprised in a PC and peripherals connected to the PC in a "soft internet phone configuration" or in recently developed "hard internet phones" which are not, ordinarily coupled to a PC.

Communication equipment 24 comprises a speaker 26 and a microphone 28, which may for example be comprised in a regular telephone or a cell phone, a sound card 30 for A/D and D/A conversion of audio signals and an audio codec 32 for coding and decoding digital audio signals. In addition, the communication equipment comprises a VOIP Packer 34 that packages audio frames in data packets for transmission over the internet. Data packets generated by VOIP Packer 34 are transmitted to the interlocutor over the internet by a suitable modem 36. Sound card 30 and codec 32 are generally implemented in hardware. VOIP Packer 34 is generally a software application.

A controller 38 controls VOIP Packer 34 to determine whether the VOIP Packer packages audio frames with or without redundancy coding. Controller 38 receives information regarding rate of packet loss suffered by transmissions over the internet from a network monitor 40 and controls VOIP Packer 34 to pack audio frames with or without redundancy responsive to the received information. Directions of signal transmissions between elements of communication system 24 are indicated by arrow heads 41.

Optionally, network monitor 40 is an RTCP software application in accordance with RTCP control protocol defined in RFC 1889. The monitor periodically receives an RTCP data packet, which RTCP packet is defined in the RTCP protocol, from the interlocutor's communication equipment. Typically, the internet channel between person 20 and the interlocutor is set up so that network monitor 40 receives an RTCP packet about every 5 seconds with information indicating a rate at which data packets sent by communication equipment 24 to the interlocutor are lost. Optionally, controller 38 controls VOIP Packer 34 to implement redundancy only if a packet loss rate is greater than a predetermined maximum acceptable loss rate. Optionally, VOIP Packer 34 packages audio frames without redundancy in accordance with RTP protocol described in RFC 1889. VOIP Packer 34 packages audio frames with redundancy, optionally in accordance with the redundancy protocol for RTP described in RFC 2198.

Operation of communication equipment 24 and implementation of non-voice-selective redundancy can be understood by following transmission of speech generated by person 20 during the person's telephone conversation with his or her interlocutor.

For the duration of the telephone conversation, sounds picked up by microphone 28 are sampled and digitized. Optionally, sampling is performed at a rate of 8,000 samples per second and with a resolution of 16 bits per sample. The digitized samples are transmitted in a bit stream at 128,000 bits/s to codec 32 where they are compressed and encoded in a suitable constellation of symbols. Optionally, codec 32 parses the bit stream into audio frames of 320 bytes (2560 bits) corresponding to 20 millisecond time periods and compresses the 320 bytes into 24 bytes using methods known in the art.

Codec 32 transmits the encoded audio frames to VOIP Packer 34, which encapsulates one or more of the received encoded audio frames in an RTP packet that has a packet header having a sequence number. The sequence number corresponds to the temporal order of the RTP packet. If controller 38 controls VOIP Packer 34 to pack RTP packets without redundancy, the VOIP Packer packs each audio frame into only one RTP packet and packs each RTP packet that it creates in a data packet, optionally, in accordance with the UDP protocol. VOIP Packer 34 transmits the data packet to modem 36 for transmission over the internet to the interlocutor.

To determine a bit-rate at which the speech of person 20 is transmitted without redundancy coding, assume, by way of example, that VOIP Packer 34 packs, in accordance with a configuration provided by the RTP protocol, only one audio frame into each RTP packet. In accordance with the RTP protocol, when an RTP data packet is packed with a single audio packet, the header of the RTP packet contains 46 bytes. Assuming each 20 millisecond compressed audio frame has 24 bytes (codec dependent), each RTP packet loaded with a single audio frame contains 70 bytes. Therefore, RTP packets are transmitted every 20 milliseconds and the bit-rate at which the speech of person 20 is transmitted with no redundancy coding is therefore 28,000 bits/s.

If VOIP Packer 34 is controlled to pack RTP packets with redundancy coding, the VOIP Packer packs each audio frame into at least two different RTP packets for transmission over the internet. Each encoded audio frame is therefore transmitted at least twice to the interlocutor.

Assume, by way of example, that when VOIP Packer 34 packs audio frames with prior art non-voice-selective redundancy it packs the audio frames in accordance with a redundancy configuration provided by RFC 2198, in which only two audio frames are packed into an RTP packet. In accordance with the redundancy configuration, the n-th RTP packet generated by VOIP Packer 34 is packed with the n-th audio frame and the (n−1)-th audio frame. As a result, each audio frame is transmitted twice to the interlocutor and the probability of an audio frame not reaching its destination is substantially reduced.

When using redundancy according to RTP protocol, an RTP packet packed with two audio frames has a header containing a total of 51 bytes. Adding to the number of header bytes, 48 bytes for the number of bytes contained in the audio frames packed in the RTP packet, the "redundant coded" RTP packet contains 99 bytes. As in the case of non-redundant transmission discussed above, for which each RTP packet is packed with a single audio frame, RTP packets packed with two audio frames are transmitted over the internet to the interlocutor at 20 millisecond intervals. The bit-rate for transmitting the speech of person 20 with "two audio frame packet redundancy" is therefore 39,600 bits/s. It is therefore seen that for the above data packet transmission scenarios, an increase of about 41% in bit-rate, in comparison to the bit-rate required to transmit the person's voice without redundancy, is required to support redundancy.

When communication equipment 24 receives data packets from the interlocutor's communication equipment, the process described above for encoding data packets that are transmitted to the interlocutor is reversed to decode the received data packets. VOIP Packer 34 functions as an "unpacker" and strips off the headers of the received RTP packets to unpack the audio frames they carry and concatenates the audio frames according to the sequence numbers of their respective RTP packets. If the received data packets are coded for redundancy, duplicated audio frames are discarded. The concatenated audio frames are decoded by codec 32 into a bit stream that is transmitted to sound card 30. Sound card 30 converts the bit stream into analogue signals that are input to speaker 26 which reproduces the interlocutor's speech encoded in the received packets responsive to the analogue signals.

Figure 2:
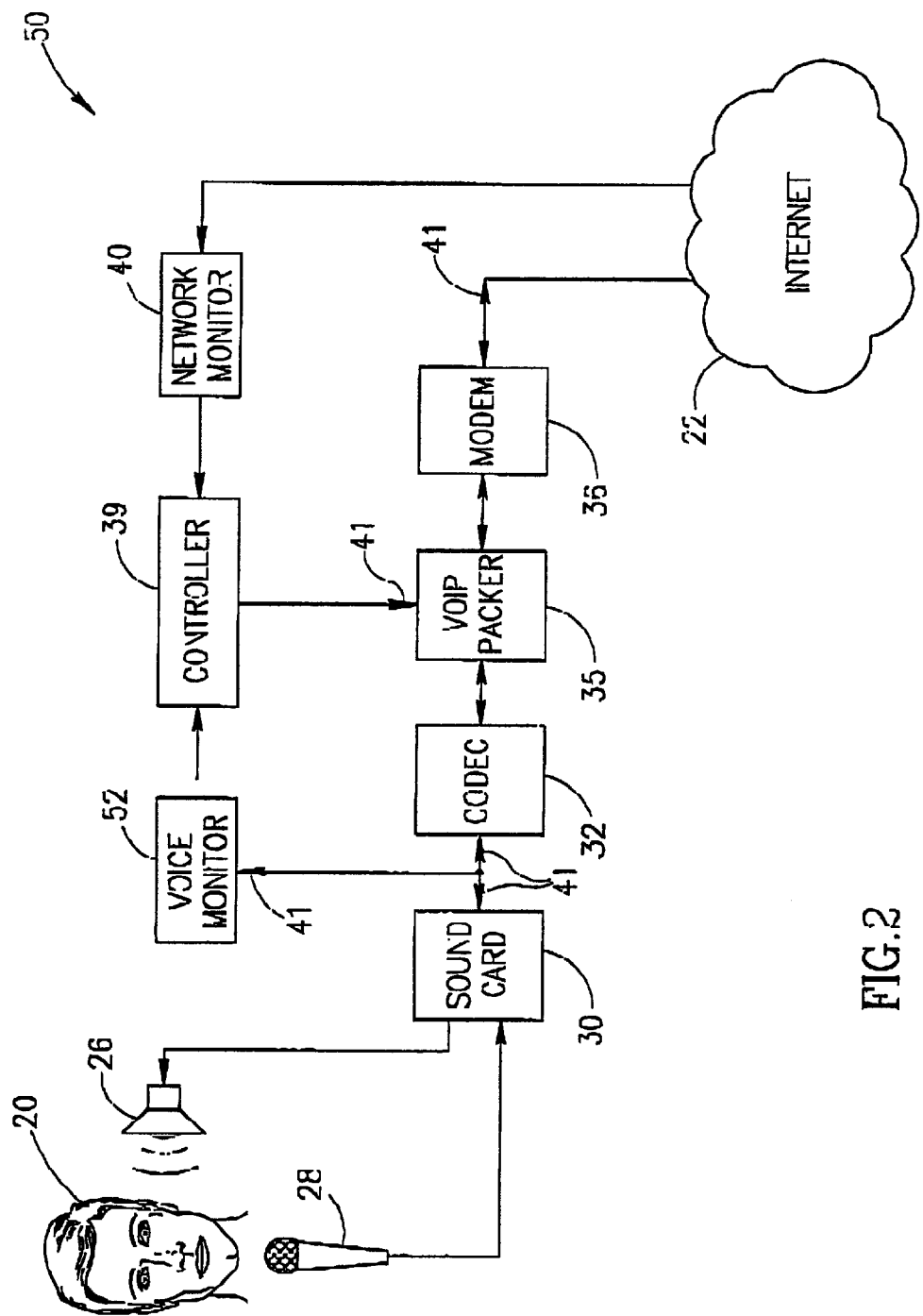
FIG. 2 schematically shows a person engaging in an internet telephony session using communication equipment that implements voice-selective redundant VOIP, in accordance with an embodiment of the present invention.

FIG. 2 schematically shows person 20 engaging in an internet telephony session with an interlocutor using communication equipment 50 that implements voice-selective redundant VOIP, in accordance with an embodiment of the present invention.

Communication equipment 50 is, by way of example, similar to communication equipment 24 and comprises components similar to those of communication equipment 24. In addition, in accordance with an embodiment of the present invention, communication equipment 50 also comprises a voice monitor 52 and a controller 39. Optionally, voice monitor 52 is connected to the output of sound card 30. Controller 39 provides, in addition to control functions provided by conventional controllers, control functions described below which are not provided in prior art.

A VOIP Packer 35 receives control signals from controller 39. Voice monitor 52 monitors speech of person 20 and analyzes the speech, using methods known in the art, to determine whether the person is speaking or silent and optionally, if speaking to identify stationary intervals of voice periods. For example, monitor 52 may determine that the person is speaking if microphone 28 senses sound having intensity greater than a predetermined threshold intensity. If monitor 52 determines that the person is speaking, the monitor optionally analyzes the person's speech to identify stationary intervals of the speech.

Voice monitor 52 generates signals indicating silent periods and optionally stationary intervals of voice periods of the speech of person 20 responsive to the results of the analysis it performs and transmits the signals to controller 39. In accordance with an embodiment of the present invention, controller 39 uses the signals to determine when to implement redundancy coding for the person's speech. In accordance with an embodiment of the present invention, controller 39 uses the signals to implement voice-selective redundancy coding. Controller 39 does not enable VOIP Packer 35 to implement redundancy if the signals indicate that person 20 is silent or that the person's speech is stationary. In accordance with an embodiment of the present invention, controller 39 controls VOIP Packer 35 to implement redundancy only if network monitor 40 indicates that packet loss rate has exceeded an acceptable maximum loss rate (and voice monitor 52 indicates that the speech of person 20 is non-stationary).

By implementing voice-selective redundancy, in accordance with an embodiment of the present invention, redundancy can be provided at bit-rates substantially less than bit rates required to provide prior art non-voice-selective redundancy. To compare with the bit-rate required to support non-voice-selective redundancy calculated above, assume that controller 39 controls VOIP Packer 35 to implement "two audio frame per RTP packet redundancy" of the type described above only when person 20 is speaking. Further, assume that when the person is speaking, VOIP Packer 35 redundancy codes all the person's speech, including times during which the person's speech is stationary. Assuming that voice periods account for 40% of the person's speech, an average bit-rate of 32,640 bits/s is required to support redundancy instead of the "prior art bit rate" of 39,600 bits/s. Encoding only voice periods, in accordance with an embodiment of the present invention, provides a saving in bandwidth of about 17.6%.

Now assume that in addition, in accordance with an embodiment of the present invention, VOIP Packer 35 is controlled so that it does not redundancy code "stationary" audio packets, i.e. audio packets containing stationary audio frames, corresponding to stationary intervals of voice periods of the speech of person 20. Assuming that about 50% of a voice period is stationary, an average bit rate of 30,320 bits/s is required to support redundancy instead of the prior art bit rate. Redundancy coding provides a further saving of bandwidth (relative to the prior art redundancy rate of 39,600) of about 6%.

In the above description, a distinction between stationary and non-stationary audio frames, in accordance with an embodiment of the present invention, is used to determine whether audio frames corresponding to voice periods are transmitted more than once when redundancy is desired. In accordance with some embodiments of the present invention, the distinction between stationary and non-stationary audio frames is used to determine whether or not to transmit an audio frame at all. Only non-stationary frames are transmitted and stationary audio frames, which duplicate information contained in non-stationary audio frames, are reconstructed from the transmitted non-stationary audio frames. Bandwidth is thus saved whilst maintaining quality.

For example, in an internet telephony session, in accordance with an embodiment of the present invention, only non-stationary audio frames and/or audio frames that are a first audio frame of a silent period of a party to the session are transmitted. Packet reconstruction may then be achieved at the receiving side, for example, using the temporal order of the RTP sequence numbers of the sender. The expected delay between packets is known from the codec and therefore packets not sent are identified and reconstructed, for example, using the previous packet. Thus sequences of stationary frames beginning with a non-stationary frame need not be sent. Only the non-stationary frame at the beginning of the sequence containing information required to reproduce the sequence is sent. Preferably, transmitted non-stationary audio frames and/or audio frames that are a first audio frame of a silent period are transmitted at least twice.

It is noted that whereas voice-selective redundancy has been described for use in internet telephony the methods and apparatus are viable and can be advantageous for use with other packet switched networks irrespective of information being transmitted. For example, embodiments of the present invention can be used for video transmissions over packet-switched networks.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for transmitting speech of a first person communicating with a second person via a packet switched network comprising:

generating a stream of samples of the first person's speech during the communication;

parsing the sample stream into audio frames;

determining which audio frames correspond to periods when the first person is speaking and which correspond to periods when the first person is silent;

transmitting audio frames corresponding to silent periods and speaking periods of the first person's speech; and transmitting at least some of the audio frames corresponding to speaking periods, but none of the audio frames corresponding to silent periods, at least twice.

2. A method according to claim 1 wherein transmitting an audio frame corresponding to a speaking period at least twice comprises transmitting the audio frame at least twice only if a quality of transmission criterion indicates that the audio frame should be transmitted at least twice.

3. A method according to claim 2 wherein the quality of transmission criterion is a packet loss rate criterion and an audio frame is transmitted at least twice only if the packet loss rate over the network between the first and second persons exceeds a predetermined maximum.

4. A method according to claim 1 wherein transmitting audio frames corresponding to silent periods and speaking periods comprises transmitting each of the audio frames into which the first person's speech is parsed at least once.

5. A method according to claim 1 wherein transmitting at least some of the audio frames corresponding to speaking periods at least twice comprises:

for each audio frame corresponding to a speaking period, determining that the audio frame is a stationary audio frame if it is an audio frame, but not the first audio frame, of a sequence of at least two consecutive audio frames for which the first person's speech is stationary; and only if the audio frame is not a stationary audio frame, transmitting the audio frame at least twice.

6. A method according to claim 5 wherein transmitting an audio frame corresponding to a speaking period at least twice comprises transmitting the audio frame at least twice only if a quality of transmission criterion indicates that the audio frame should be transmitted at least twice.

7. A method according to claim 6 wherein the quality of transmission criterion is a packet loss rate criterion and an audio frame is transmitted at least twice only if the packet loss rate over the network between the first and second persons exceeds a predetermined maximum.

8. A method according to claim 5 wherein transmitting audio frames corresponding to silent periods and speaking periods comprises transmitting each of the audio frames into which the first person's speech is parsed at least once.

9. A method for transmitting speech of a first person communicating with a second person via a packet switched network comprising:

generating a stream of samples of the first person's speech during the communication;

parsing the sample stream into audio frames;

determining which audio frames correspond to periods when the first person is speaking and which correspond to periods when the first person is silent;

transmitting audio frames corresponding to silent periods and speaking periods of the first person's speech;

for each audio frame corresponding to a speaking period, determining that the audio frame is a stationary audio frame if it is an audio frame, but not the first audio frame, of a sequence of at least two consecutive audio frames for which the first person's speech is stationary; and transmitting the audio frame at least twice if and only if it is not a stationary audio frame.

10. A method according to any of claims 9 wherein transmitting audio frames corresponding to silent periods and speaking periods comprises transmitting each of the audio frames into which the first person's speech is parsed at least once.

11. A method for transmitting speech of a first person communicating with a second person via a packet switched network comprising:

generating a stream of samples of the first person's speech during the communication;

parsing the sample stream into audio frames;

determining which audio frames correspond to periods when the first person is speaking and which correspond to periods when the first person is silent;

for each audio frame corresponding to a speaking period, determining that the audio frame is a stationary audio frame if it is an audio frame, but not the first audio frame, of a sequence of at least two consecutive audio frames for which the first person's speech is stationary; and transmitting the audio frame at least once if it is not a stationary audio frame and not transmitting the audio frame if it is a stationary audio frame.

12. A method according to claim 11 and comprising not transmitting audio frames of the first person's speech if the audio frames correspond to periods when the first person is silent.

13. A method according to claim 11 and comprising for each silent period transmitting only a first audio frame of the silent period at least once.

14. Apparatus for transmitting a person's speech over a packet switched network comprising:

transmission apparatus that generates audio frames of the person's speech and transmits the audio frames over the network;

a network sensor that determines whether audio frames should be transmitted more than once to meet a quality criteria of transmission;

a voice monitor that determines during speech when the person is speaking and when the person is silent; and a controller that controls the transmission apparatus, wherein if the network monitor determines that an audio frame should be transmitted more than once, the controller controls the transmission apparatus to transmit the audio frame more than once only if the voice monitor indicates that the audio frame does not correspond to a time when the person is silent.

15. Apparatus according to claim 14 wherein the voice monitor determines whether an audio frame corresponding to a time at which the person is speaking corresponds to a time during which the person's speech is stationary.

16. Apparatus according to claim 15 wherein if the voice monitor determines that an audio frame corresponds to a time at which the person's speech is stationary, the controller controls the transmission apparatus to transmit the audio frame only once.

* * * * *